March 29, 1927.  1,622,956

J. A. MALM

COMBINED OIL CLUTCH AND HUB FOR WHEELS

Original Filed May 31, 1921     3 Sheets-Sheet 1

Inventor

J. A. Malm

By

Attorney

March 29, 1927. 1,622,956

J. A. MALM

COMBINED OIL CLUTCH AND HUB FOR WHEELS

Original Filed May 31, 1921  3 Sheets-Sheet 2

Inventor
John A. Malm.
By
Attorney

March 29, 1927.
J. A. MALM
1,622,956
COMBINED OIL CLUTCH AND HUB FOR WHEELS
Original Filed May 31, 1921   3 Sheets-Sheet 3
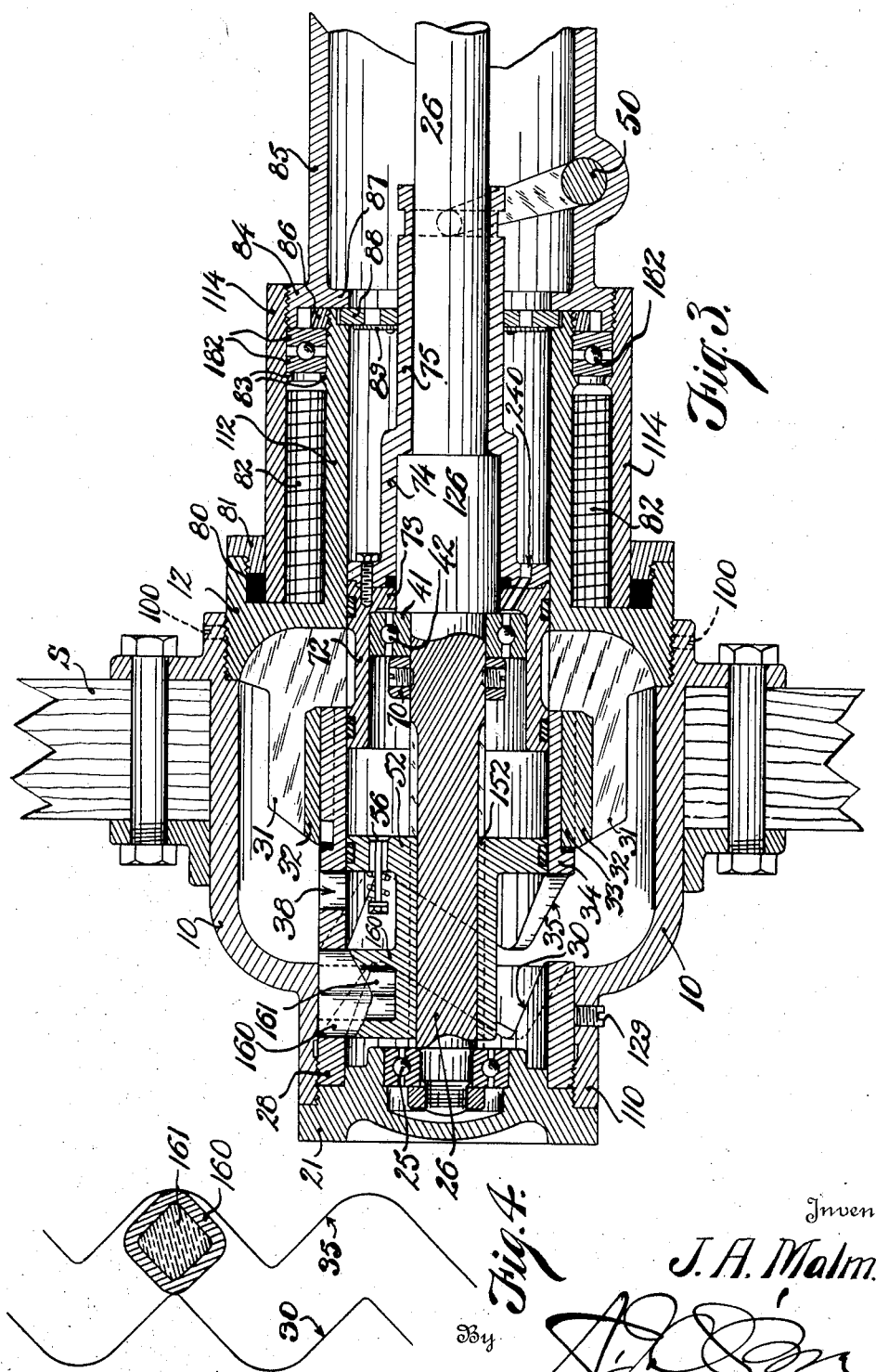

Patented Mar. 29, 1927.

1,622,956

UNITED STATES PATENT OFFICE.

JOHN A. MALM, OF DENVER, COLORADO.

COMBINED OIL CLUTCH AND HUB FOR WHEELS.

Application filed May 31, 1921, Serial No. 474,009. Renewed October 11, 1926.

The object of this invention is to provide a variable speed clutch adapted to be carried in the hub of a wheel.

Briefly, the invention comprises a casing which constitutes the main member of the hub, which casing contains an oil clutch. The clutch consists of a piston reciprocable longitudinally of the axle which projects into the casing, said piston cooperating with a short cylinder which is controlled by a valve for determining the movement of oil from one side of the piston to the other, said valve also being slidable along the axle. The piston carries one or more projecting pins or the like adapted to travel along a cam track during reciprocation of the piston. The cam track is provided by means of two spaced shells having their opposed edges formed as cam faces which determine movement of said pins. One of said shells is carried by the rear of the hub and the other by the front thereof.

In the drawings:

Fig. 3 is a longitudinal section of a modification, and

Fig. 4 is a diagrammatic view showing the relation of the pin on the piston of Fig. 3 to the cam groove.

Figure 1:
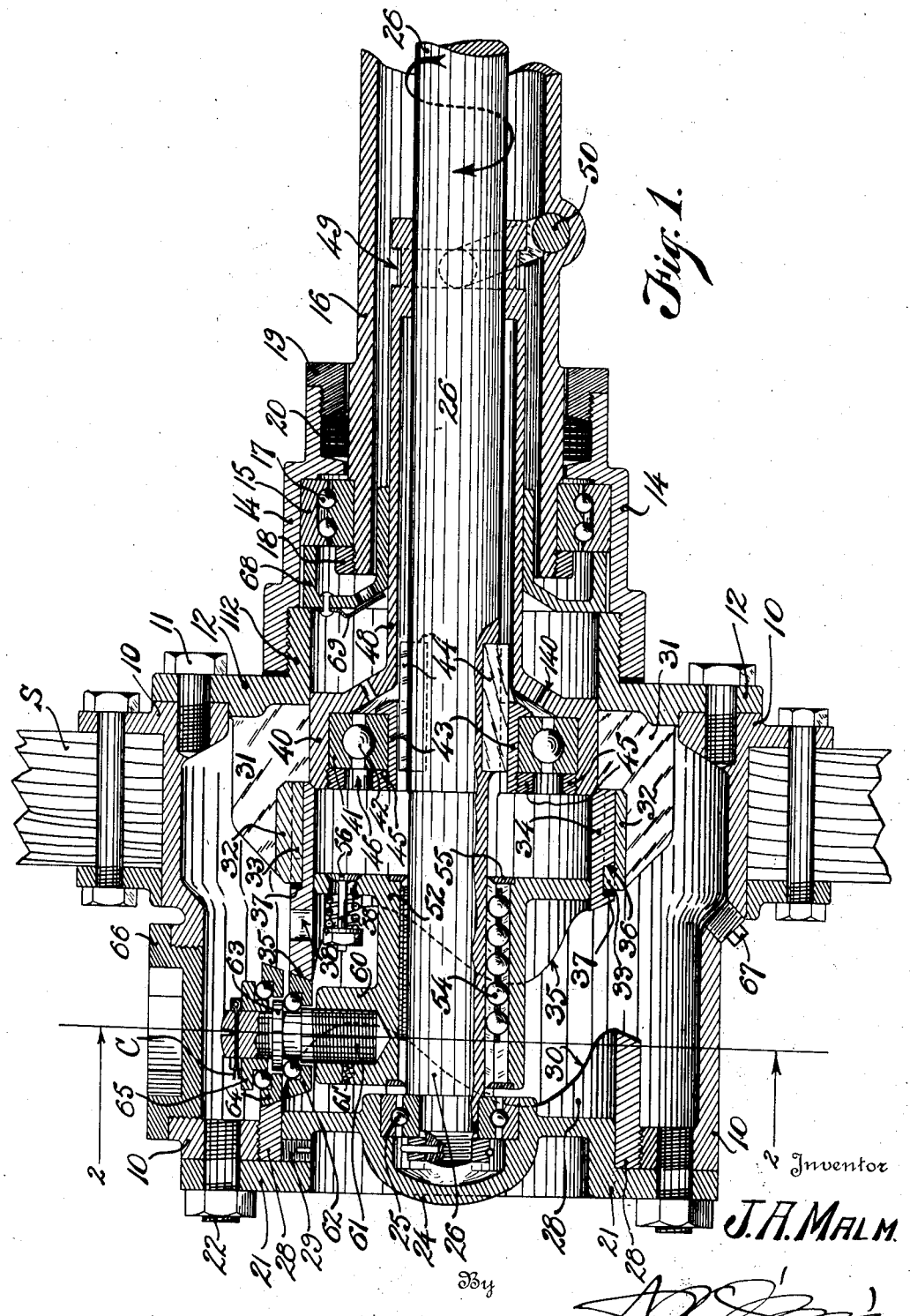
Fig. 1 is a longitudinal section through the hub and clutch taken on line 1—1 of Fig. 2.
Figure 2:
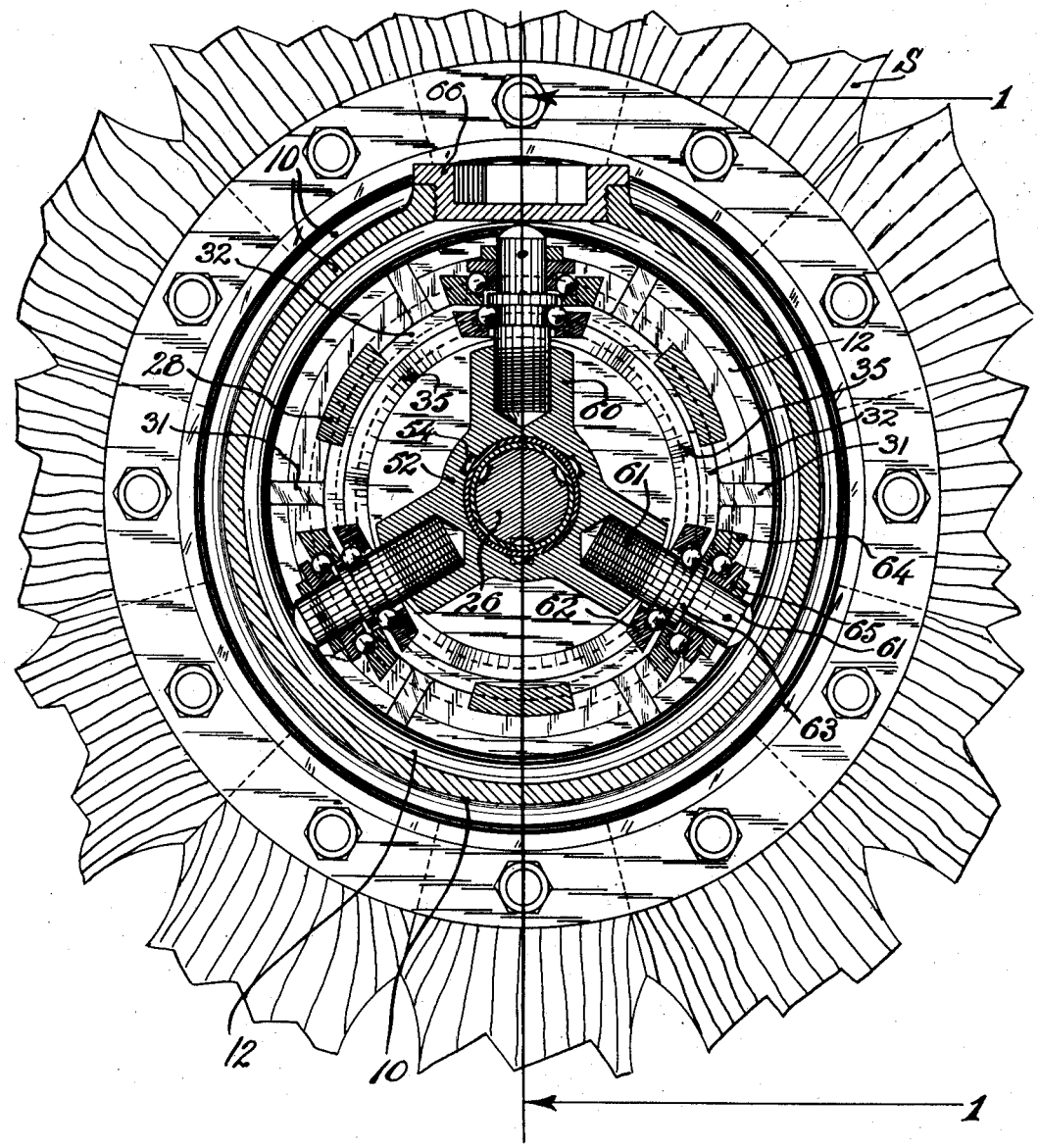
Fig. 2 is a cross section taken on the line 2—2 of Fig. 1.

The body member of the hub comprises a casing 10 to which the spokes S of the wheel are secured. A rear head 12 is secured to the casing 10 by means of bolts or screws 11. The rear head 12 is provided with a rearwardly directed cylindrical extension 112 upon which is threaded a collar 14, bearing races 15 being held between said collar 14 and the axle housing 16, said bearing races 15 retaining balls 17 and being themselves retained in position between a shoulder of the collar 14 and a ring 18 threaded onto the end of the housing 16. A packing nut 19 retains packing material 20 in position between said collar and the housing.

The casing 10 also has a front head 21 secured thereto as by means of bolts 22, the center of the head 21 being pocketed at 24 to receive bearings 25 for the extremity of the axle 26. A cam shell 28 is threaded into the front of the casing 10 and is retained in position by means of the head 21, a set screw 29 projecting through the head 21. This cam shell 28, by reason of its threaded connection, is thus adjustable longitudinally of the shaft 26 and also peripherally. Said shell 28 is cylindrical and its inner edge is in the form of a cam face 30. The shell 28 cooperates with an opposed cylindrical cam shell 34 having a cam edge 35 corresponding and cooperating with the opposed cam edge 30. Said shell 34 is carried by means of webs 31 projecting forward from the rear head 12 and carrying a retaining sleeve 32 having integral splines 33 which engage in longitudinally disposed grooves of the shell 34. In this manner shell 34 is non-rotatably carried by the sleeve 32 but is adjustable longitudinally thereof. This adjustment is accomplished by means of an annular groove 36 in the shell 34 in which shims 37 are positioned for engagement between the forward wall of the groove 36 and the forward edges of the integral splining ribs 33. The forwardly projecting parts of the cam shell 34 are preferably provided with apertures 38 which perform the double function of lightening the shell 34 and facilitating the passing of oil from one side thereof to the other. A sleeve valve 40, slidable longitudinally of the axle 26, is provided for cooperation with the shell 34 to control the passage of oil around the rear edge of said shell 34. This valve 40 carries bearing races 41 which receive between them balls 42, one of said bearing races 41 being carried by a collar 43 splined at 44 on the shaft 26. The bearing races 41 are retained in position between the valve 40 and collar 43 by means of special retaining rings 45 threaded into both of said valve 40 and collar 43, an annular space 46 being provided between said rings 45 for the free circulation of oil past the balls 42, and the rear tapering wall of the valve 40 is provided with apertures 140 for the free passage of oil from one side of the valve to the other by way of the space 46, when the valve 40 is reciprocating. The valve 40 is carried by a valve sleeve or cylindrical stem 48 which extends rearward along the axle 26 where it is provided with a bearing engaging the axle 26 and with a groove 49 for engagement by a yoke 50 operable by any suitable means, not shown, to reciprocate the valve 40. It will be noted that the engaging edges of the valve 40 and the shell 34 are beveled to insure efficient operation.

The piston 52 is splined on the axle 26 by means of ball bearings 54 traveling in grooves in the piston and in the axle and carried by special retainers as more particularly set forth in my companion application, Serial No. 474,008 of even date, special flanges 55 being provided, as in said companion application, to retain the balls 54 in their grooves and to prevent passage of oil therethru. The head of the piston 52 is preferably provided with a valve 56 controlled by a strong spring 58 which will yield under excessive loads. Expansion of the oil under temperature changes will be cared for by the escape of oil into the housing 16 between the rear end of the valve sleeve 48 and the axle 26.

The piston 52 carries one or more projecting studs 60 each of which receives a screw threaded pin 61 which may be retained in the respective studs by means of a set screw 61'. Each pin 61 carries an annular rib or shoulder 63 cooperating with a bevel faced roller 62, balls being positioned between said roller 62 and shoulder 63. The outer end of the pin 61 carries a bevel faced roller 64 retained by means of balls as shown and a castellated nut 65 adapted to be retained in adjusted position by means of a cotter pin C.

It will be noted that the inner roller 62 is smaller than the outer roller 64, said roller 62 traveling along the cam face 35 of the shell 34, and the roller 64 traveling along the cam face 30 of the shell 28, said shell 34 being smaller in diameter than said shell 28. The position of roller 62 with reference to the beveled cam face 35, may be adjusted by adjusting the pin 61 and resetting the set screw 61', and the relation of roller 64 to cam face 30 may be adjusted by means of the nut 65. Oil may be introduced into the casing 10 by removing the cap 66 and may be drained therefrom by removing the plug 67.

As above indicated, excess pressure of the oil due to temperature changes will result in seepage of the excess into the axle housing 16. In the event that too much oil has seeped past and when temperature drops, oil will be drawn back into the space behind the valve 40 through a floating hub disc 68 carried between the rear end of extension 112 and the forward edge of the outer bearing race 15, said disc 68 having a central sleeve snugly engaging the valve sleeve 48 and being provided with a spring valve 69 to permit said return of oil. With this construction whenever the supply of oil within the casing 10 becomes too low by reason of seepage into the casing 16, suction of the piston or change in temperature, as the case may be, will result in replenishment by way of valve 69.

In Fig. 3 a slightly modified form is shown. In this instance the casing 10 is threaded onto the rear head 12 and retained by means of set screws 100. The forward portion of casing 10 is provided with a reduced extension 110 into which the front head or cap 21 is threaded, the shell 28 being secured by means of a set screw 129 threaded through said extension 110. In this form the shells 28 and 34 are of equal diameter so that the cam faces 30 and 35 are directly opposite one another. However, instead of using rollers carried by studs as in the other form, the stud 160 is extended to engage the cam faces 30 and 35 itself. Since said stud 160 is rigid, its corners are rounded for free travel along the faces 30 and 35 as shown in Fig. 4, the faces of the stud itself being flat, as also shown at Fig. 4. In order to cooperate with the corners of the stud, alternate nodes of the cam faces 30 and 35 will be formed on a wide curve while the intermediate nodes will be pointed. In order to lighten the stud, the same is hollowed out and is then filled with some lighter material such as aluminum or preferably cork.

The bearings 41 and 42 for the valve are retained by means of a collar 70 secured to the axle 26, the valve 72 of this form being reciprocable within the shell 34 and being provided with piston rings as shown. The inner edges of the connecting webs 31 are flush with the inner wall of the shell 34 so that said webs will retain piston rings when the valve 72 is withdrawn rearward to permit flow of oil. The rear head 73 of the valve 72 is secured to an enlargement 74 of the cylindrical valve stem 75 which in turn is operable by means of the yoke 50. The enlargement 74 is slidable upon an enlargement 126 of the axle 26, said offset 74 being provided to compensate for the thickness of the valve stem 75 in order that the displacement of oil when said valve 72 is moved, will be the same in the front of the valve as in the rear thereof, the oil being allowed to pass from front to rear past the balls 42 by means of a passage 240.

In this modification the collar 114 is somewhat different from the collar in Fig. 1. Packing material 80 is secured between an overhanging flange of the head 12 and said collar 114 by means of a packing ring 81. Roller bearings 82 are positioned between the collar 114 and the extension 112 of head 12 and shoulders 83 are provided on the collar 114 and extension 112 to retain thrust bearings 182. The rear faces of said thrust bearings 182 are engaged by an extension 84 of the axle housing 85, which is threaded into the collar 114, and by means of a ring 86 threaded onto the rear end of extension 112 of the head 12. An internal annular flange 87 retains a disc 88 provided with spring valves 89 which permit the return of oil from the axle housing to the space behind the valve 72 in the same manner as in the other form.

In the operation of both forms of this invention, retraction of the valves 40 and 72 will permit free circulation of oil around the sleeve 32 from one side of the piston to the other so that the piston may reciprocate upon the shaft 26 as the rollers 62 and 64 or the stud 160, as the case may be, follow the cam grooves. As the valve is closed circulation of the oil is retarded and the rollers or stud on the piston transmit part of the force applied by the axle 26 to the cam walls of the shells 28 and 34, thereby producing rotation of the hub 10, said hub rotating at the full speed of the axle 26 when the valve is entirely closed.

With both forms of this invention it is possible to remove the wheel easily. In the form of Fig. 1, the bolts 11 at the rear thereof may be removed so that the hub 10 with head 21 and shell 28 may be readily withdrawn. By removing the head 21, ready access to the rollers 62 and 64 and to the piston may be had.

In the form of Fig. 3 the set screws 100 are first removed from the back of the hub 10 and the piston is so moved that it will be at its rearward position, this position being readily determined by removal of cap 21, whereupon the entire hub may be unthreaded from the rear head 12 leaving the shell 34 and piston 52 exposed on the end of the axle 26.

It will be noted that the floating hub disc 68 and floating disc 88 of the two forms are retained in position radially by engagement with the valve sleeves 48 and 75, respectively, the outer edges or faces of the discs being spaced from the adjacent peripheral walls of parts 14 and 112. In this manner machining the discs for direct support upon said peripheral walls is avoided. But the main object of this structure is to avoid three point support of valve stem 48 and probable binding effect thereof, as the valve disc 68 will adjust itself to the requirement of shaft 26 and to the guides 31 and 112 for the valve 40.

The operation of my device is as follows: Shaft 26 is rotated in the direction of the arrow, by means of the driving engine, which is not shown. Valve 40 being opened or withdrawn to the right, leaves an annular passage between it and the edge of sleeve 34.

As the shaft 26 rotates, it carries with it the piston 52 which will be reciprocated on the shaft by the action of the rollers 62 and 64 on the cam faces 35 and 30, as long as valve 40 is open. When it is desired to rotate the wheels, the valve is gradually closed, and as the passage for the oil grows smaller, the movement of the piston will be resisted by the oil, with the result that a force will be produced, which tends to rotate the hub and the wheel. When valve 40 is entirely closed, piston 52 will no longer be able to reciprocate, and, therefore, the rotation of the shaft 26 will cause a corresponding rotation of the wheel.

I claim:

1. A wheel hub comprising a casing enclosing a chamber, a pair of spaced shells within said chamber and carried by the casing, said shells providing a cam groove between them, a shaft extending within one of said shells, a piston reciprocable on said shaft, means to control the movement of oil from one end of the piston to the other, and means on the piston projecting into said cam groove for driving the hub, said piston being provided with means yieldable under excessive pressure.

2. A wheel hub comprising a casing enclosing a chamber, a pair of spaced shells within said chamber and carried by the casing, said shells providing a cam groove between them, a shaft extending within one of said shells, a piston reciprocable on said shaft, means to control the movement of oil from one end of the piston to the other, and means on the piston projecting into said cam groove for driving the hub, said piston being yieldable under excessive pressure.

3. A wheel hub comprising a casing enclosing a chamber, a pair of spaced shells within said chamber and carried by the casing, said shells providing a cam groove between them, a shaft extending within one of said shells, a piston reciprocable on said shaft, means to control the movement of oil from one end of the piston to the other, means on the piston projecting into said cam groove for driving the hub, means to permit the escape of oil from said chamber under excessive pressure, and means to permit the return of oil when the pressure falls.

4. A wheel hub comprising a casing adapted to contain a liquid, a rear head on said casing, a pair of spaced cam shells fixedly carried within the casing and providing a cam groove between them, an axle projecting within one of said shells, a piston reciprocable on the axle, projecting means on the piston and projecting into said groove and a valve slidable within said head and cooperating with one of the shells to control the movement of liquid from one side of the piston to the other.

5. A wheel hub comprising a casing, a rear head on said casing, a pair of spaced cam shells fixedly carried within the casing and providing a cam groove between them, an axle projecting within one of said shells, a piston reciprocable on the axle, projecting means on the piston and projecting into said groove, and a valve slidable within said head and cooperating with one of the shells to control the movement of liquid from one side of the piston to the other, said valve being slidable upon said axle.

6. A wheel hub comprising a casing adapted to contain oil, having front and rear portions and enclosing a chamber, a cam shell carried by the front portion and a cam shell carried by the rear portion, said cam shells being spaced from each other and providing a cam groove between them, an axle projecting within one of said shells, a piston reciprocable on said axle, projecting means on said piston and positioned within said groove, and means comprising a valve for controlling the flow of oil within the casing.

7. A wheel hub comprising a casing adapted to contain a liquid and having front and rear portions and enclosing a chamber, a cam shell carried by the front portion and a cam shell carried by the rear portion, said cam shells being spaced from each other and providing a cam groove between them, an axle projecting within one of said shells, a piston reciprocable on said axle, projecting means on said piston and positioned within said groove, and a valve slidable within said rear portion and cooperating with the rear shell member to control the movement of liquid from one side of the piston to the other.

8. A wheel hub comprising a casing adapted to contain oil and having front and rear portions and enclosing a chamber, a cam shell carried by the front portion and a cam shell carried by the rear portion, said cam shells being spaced from each other and providing a cam groove between them, an axle projecting within one of said shells, a piston reciprocable on said axle, projecting means on said piston and positioned within said groove, said rear portion being separable from said casing, and means within said casing for controlling the flow of oil.

9. A wheel hub comprising a casing having front and rear portions and enclosing a chamber, a cam shell carried by the front portion and a cam shell carried by the rear portion, said cam shells being spaced from each other and providing a cam groove between them, an axle projecting within one of said shells, a piston reciprocable on said axle, projecting means on said piston and positioned within said groove, said front portion and front shell being removable from said casing, and means slidable on the axle for controlling the movement of oil within the casing.

10. A wheel hub comprising a casing having front and rear portions and enclosing a chamber, a cam shell carried by the front portion and a cam shell carried by the rear portion, said cam shells being spaced from each other and providing a cam groove between them, an axle projecting within one of said shells, a piston reciprocable on said axle, projecting means on said piston and positioned within said groove, and a valve slidable within said rear portion and cooperating with the rear shell member to control the movement of liquid from one side of the piston to the other, the space behind said valve being connected with the space in front thereof and having equal cross sectional area so that displacement will be equal on both sides of the valve.

11. In combination, a reciprocable piston, cam means presenting two cam walls, one of said walls being higher than the other, a projecting member carried by the piston and engaging said walls, said member comprising a pin adjustably mounted on the piston, a roller journalled on the pin, an annular shoulder on the pin, cooperating with one cam wall to position the roller, a second roller on the pin, and an adjustable bearing cooperating with the other cam wall to position said second roller.

12. A wheel hub comprising a casing enclosing a chamber, a pair of spaced shells within said chamber and carried by the casing, said shells providing a cam groove between them, a shaft, a piston reciprocable on said shaft, means to control the movement of oil from one end of the piston to the other, and means on the piston projecting into said cam groove for driving the hub, said piston being provided with means yieldable under excessive pressure.

13. A wheel hub comprising a casing enclosing a chamber, a pair of spaced shells within said chamber and carried by the casing, said shells providing a cam groove between them, a shaft, a piston reciprocable on said shaft, means to control the movement of oil from one end of the piston to the other, and means on the piston projecting into said cam groove for driving the hub, said piston being yieldable under excessive pressure.

14. In an oil clutch, the combination of a casing, a shaft extending within the casing, a piston reciprocable on said shaft, a pair of opposed shells spaced apart to form a groove, a projecting member on said piston adapted to travel in the groove formed by said opposed shells, and means for adjusting the width of said groove.

15. In an oil clutch, the combination of a casing, a shaft extending within the casing, a piston reciprocable on said shaft, a pair of relatively movable shells having cam edges spaced apart to form a groove, a projecting member on said piston adapted to travel in the groove formed by said opposed shells, said groove being adjustable, by moving either of the shells lengthwise.

16. In an oil clutch, a casing, comprising a chamber subject to pressure, another non-pressure chamber independent of the casing, and a transversely movable disc between said chambers, said disc having a valve to open toward the high pressure chamber.

In testimony whereof I affix my signature.

JOHN A. MALM.